Jan. 20, 1970　　　C. E. CLEMENS　　　3,490,173
CONTRACTIBLE DOOR
Filed March 22, 1968
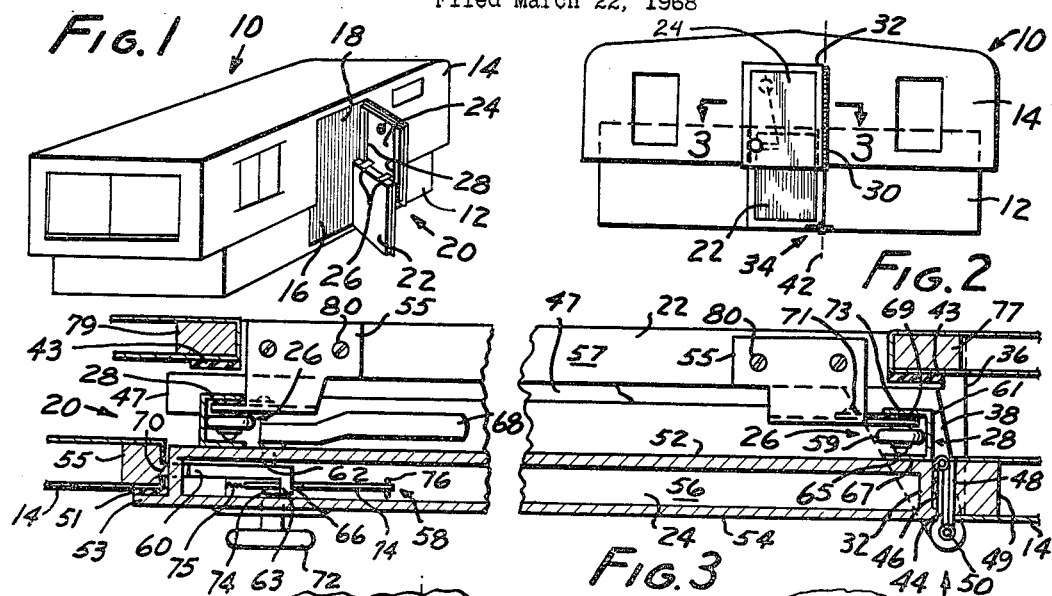
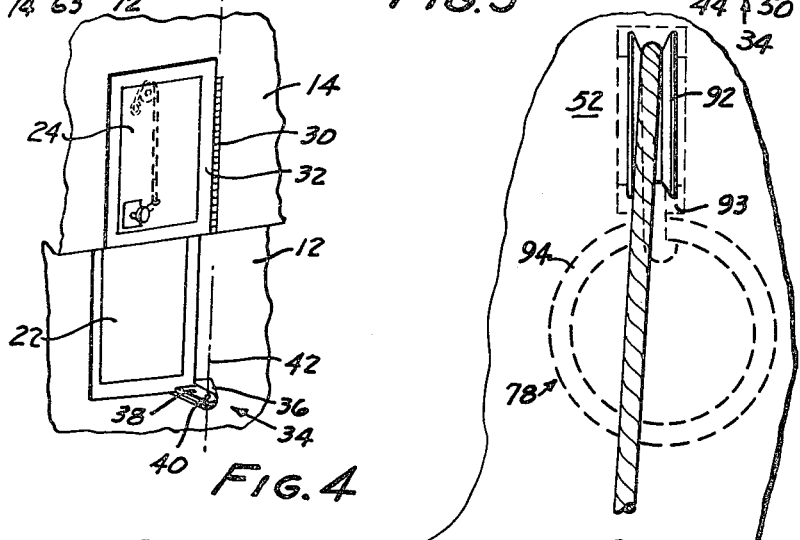
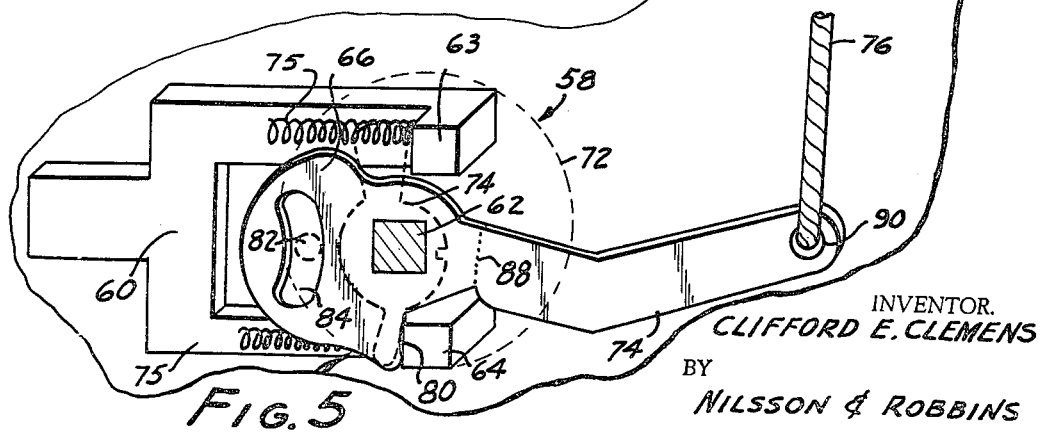
INVENTOR.
CLIFFORD E. CLEMENS
BY
NILSSON & ROBBINS
ATTORNEYS.

United States Patent Office 3,490,173
Patented Jan. 20, 1970

3,490,173
CONTRACTIBLE DOOR
Clifford E. Clemens, 5114 Cerrillos Drive,
Woodland Hills, Calif. 91364
Filed Mar. 22, 1968, Ser. No. 715,294
Int. Cl. E05c 7/00; E05d 5/22
U.S. Cl. 49—104                    6 Claims

ABSTRACT OF THE DISCLOSURE

A contractible door assembly, useful in telescopic trailers, in which upper and lower door sections are slidably disposed and pivot means on one section are aligned with pivot means on the other section to allow both sections to be opened as a unit. Lock releasing means that are normally inaccessible when the door assembly is contracted are made accessible by auxiliary means extending therefrom.

BACKGROUND OF THE INVENTION

Field of the invention

The field of art to which the invention pertains includes the field of land vehicles, particularly doors thereof having telescoping and pivotally connection sections.

Description of the prior art

Telescoping trailers (and campers) have added safety, comfort and economy to trailer-towing by providing a low silhouette during travel and a comfortable height when camped. At full height, the trailer allows walk-in head room. By contracting the trailer for travel, wind resistance is greatly reduced and the center of gravity is lowered, eliminating surging, swaying and fishtailing. Higher travel speeds can be safely used and gasoline mileage is substantially increased.

Such trailers are provided with double, overlapping doors with top and bottom halves opening separately. Double locks are required and double effort is needed to open the door; entry into and exit from a contracting trailer is difficult to maneuver. Because of these difficulties, manufacturers of telescoping trailers avoid using full-length doors on closets and showers.

A need therefore exists for a door assembly for telescoping trailers which can contract as the trailer is contracted and open as a unit in either contracted or extended form.

SUMMARY OF THE INVENTION

The present invention provides a contractible door assembly for a telescoping trailer that is simple and inexpensive in construction and yet opens as a unit in either contracted or extended form. First and second door sections are provided slidably disposed to form the door, and pivot means on one section are aligned with pivot means on the other section.

In a particular embodiment, the door sections slidably overlap with the pivot means of one section offset therefrom to be in alignment with the pivot means of the other section. Means are provided slidably engaging the sections so as to allow both sections to be moved as a unit. Thus, a channel member is provided on one section with a slide member on the other section having bearing surfaces within the channel member.

In a further embodiment, the contracted door can be opened from either within or without the trailer. Lock releasing means that are inaccessible when the assembly is contracted are extended by auxiliary lock releasing means that are accessible under such conditions.

BRIEF DESCRIPTION OF THE DRAWINGS

FIGURE 1 is a perspective view of a telescoping trailer incorporating a door of this invention and showing the door open and in semi-contracted condition;

FIGURE 2 is a plan view of a telescopic recreational vehicle of this invention in semi-contracted condition and with the door closed;

FIGURE 3 is a sectional view on line 3—3 of FIGURE 2 showing the interrelation of components of the door sections;

FIGURE 4 is a perspective view of a door assembly of this invention closed and in extended condition; and FIGURE 5 is a perspective view of the lock and auxiliary lock releasing means of this invention.

DESCRIPTION OF THE PREFERRED EMBODIMENTS

Referring to FIGURE 1, a telescoping trailer 10 is shown having a bottom portion 12 slidably and telescopically disposed within a top portion 14 and having doorways 16 and 18, respectively, therein. A door assembly 20 is provided comprising a lower, inner door section 22 and an upper, outer door section 24. Slide members 26 on the upper corners of the inner door section 22 are slidably engaged within U-shaped channels 28 along the edges of the outer door section 24, allowing the outer door section 24 to slide down past the inner door section 22.

Referring to FIGURES 2 and 4, the upper door section 24 is pivotally hinged to the top trailer portion 14 by an elongated hinge 30 along its pivot edge 32. The lower door section 22 is pivotally hinged to the bottom trailer portion 12 by an offset hinge 34. Referring particularly to FIGURE 4, the offset hinge 34 has a lower flat portion 36 extending horizontally from the bottom of the trailer 10. An upper flat portion 38 extends horizontally from the bottom pivot corner of the inner door section 22 and is pivotally and slidably joined to the lower hinge portion 36 by a hinge pin 40 therethrough. The hinge pin 40 defines the pivot point of the lower door section 22 with respect to the bottom trailer portion 12 and is arranged to be aligned with the pivot axis (shown as a dashed line 42) of the elongated hinge 30. With the slide members 26 of the lower door section 22 engaged within the channels 28 on the upper door section 24 (FIGURE 1), the foregoing arrangement allows both inner and outer door sections 22 and 24 to be swung out as a unit 20. Note that the offset hinge 34 has insufficient vertical extent to secure the door sections 22 and 24 in alignment, but that by providing a slide member 26 and channel 28 on that edge of the door sections, and another slide member 26 and channel 28 spaced therefrom, the door sections 22 and 24 are slidably secured in alignment.

Referring to FIGURE 3, a more detailed view of the door assembly 20 is shown. One leaf 44 of the elongated hinge 30 is attached by screws (not shown) through a rubber weatherstrip 46 to the pivot edge 32 of the outer door section 24. The other hinge leaf 48 is attached directly to the doorframe 49 of the trailer top 14. A hinge pin 50 links together the two hinge leafs 44 and 48.

The outer door section 24 has a rubber weather-strip 51 along its outer edge 53 abutting a doorjamb 55 on the trailer top 14 and a rubber weather-strip 47 (shown partially cut-away in the drawing, for clarity) along its lower edge and abutting the inner door section 22.

The inner door section 22 has a pair of L-shaped angle irons 55 attached by screws 80 at the corners of its top edge 57. The angle irons 55 serve to support the slide members 26 below the top edge 57 and offset into the U-shaped channel members 28 on the outer door section 24. The slide members are identically constructed, but for clarity of the drawing reference will be made only to the pivot side of the door assembly 20. Each slide member 26 includes a roller 59 engaging the closed end 61 of the channel member 28. Friction is reduced by a rounded Teflon bearing 65 inserted axially between the roller 59 side and one channel side 67, and by a flat Teflon bearing 69, attached to the angle iron 55 by a screw 71, between the lower portion of the angle iron 55 and the second channel side 73.

The slide member 26 slidably connect the inner door section 22 to the outer door section 24. As previously noted, the upper hinge portion 38 of the offset hinge 34 is connected to the bottom of the inner door section 22 and pivotally connected, at its offset end, to the lower hinge portion 36 by the hinge pin 40 (FIGURE 4). The lower hinge portion 36 extends from the bottom of the trailer 10 and is arranged so that the hinge pin 40 is aligned with the axis 42 (FIGURE 4) of the elongated outer door hinge pin 50.

The inner door section 22 is sufficiently narrower than the outer doorway 18 (FIGURE 1) defined by its doorframe 49 and doorjamb 55 to swing freely therethrough. Rubber weather-stripping 43 is provided on the side edges of the inner door section 22 so as to present a weather-tight closure against the inner doorframe 77 and doorjamb 79.

In operation, one merely has to swing out the outer door section 24. The inner door section 22 will swing out with it as a unit and this will occur in any contracted or extended position. The result is that only a single door need be opened whether the trailer is fully extended or fully contracted, or in between.

Referring still to FIGURE 3, the outer door section 24 has an inner panel 52 and outer panel 54 defining a hollow portion 56 in which a lock mechanism 58 is placed near the swing-out edge 53 thereof. The lock mechanism 58 includes a bolt 60 astride a shaft 62, which bolt is shiftable to extend a spring 75, as further detailed below, by a cam 66 offset on the shaft 62 and engaging a lower extension 64 (FIGURE 5) of the bolt 60.

A handle 68 is attached to the shaft 62 extending through the inner panel 52 and its upward movement causes the cam 66, via the shaft 62, to shift the bolt 60, withdrawing it from a strike 70 in the doorjamb 55. A knob 72 is rotatably secured through the outer door panel 54 and has a cam 74 thereon directly engaging the bolt extensions 63 and 64 (FIGURE 5) to shift the bolt 60 when the knob 72 is rotated in any direction. A lever bar 74 is rigidly attached to the handle cam 66 and has a cord 76 (FIGURE 5) attached thereto for remote operation of the lock 58 as detailed below.

Referring to FIGURE 5, details of the lock mechanism 58 and an auxiliary lock release 78 are shown. The handle cam, 66 offset on the shaft 62, has a flat edge 80 engageable with the lower bolt extension 64 and is guided in turning the shaft 62 by a guide pin 82 within an appropriately shaped cam aperture 84.

In operation, from inside the trailer, turning the handle 68 (FIGURE 3) upwardly rotates the shaft 62 counterclockwise (in the drawing). The handle cam edge 80 engages the bolt extension 64 shifting the bolt 60 out of its strike 70 (FIGURE 3) against the spring 75 bias and allows the door to be opened. From outside the trailer, turning the knob 72 (in shadow on FIGURE 5) clockwise or counterclockwise rotates the knob cam 74 (in shadow in FIGURE 5) associated therewith for clockwise or counterclockwise engagement of the bolt extension 63 or 64, respectively.

When the trailer 10 is in a contracted position, overlapping of the door sections 22 and 24 makes the handle 68 inaccessible. Accordingly, an auxiliary lock release 78 is provided and includes a lever bar 74 welded at 88 to the handle cam 66 to provide an extension of the cam 66 somewhat paralleling the handle 68. A cord 76 is attached through a hole 90 in the extended end of the lever bar 74 and extends over a pulley 92 within an aperture 93 in the top of the inner door panel 52. The cord is there attached to a pull-ring 94 to situate the pull-ring at the top of the door panel 52. In order to open the door from within the contracted trailer 10, one need merely to pull on the pull-ring 94 whereupon the bolt 60 is withdrawn from the strike 70 and the door sections 22 and 24 swing open outwardly as a unit.

Various modifications and changes may be made within the spirit of this invention. For example, the handle 68 may be placed on the inner door section 22 with linkages and couplings appropriate to allow the door to be opened from within the contracted trailer without the use of a pull-ring. Still other modifications may be effected without departing from the scope of the novel concepts of this invention.

What is claimed is:

1. A vehicle that can be telescoped from an extended to a contracted form, comprising:
   a first housing portion having a first door section hingedly mounted thereon;
   a second housing portion slideably within said first housing portion and having a second door section hingedly mounted thereon in opposed slideable relation to said first door section;
   first pivot means at a first side edge of one of said door sections defining a hinge axis;
   second pivot means at a first side edge of the other of said door sections, said second pivot means comprising an offset hinge disposed adjacent a horizontal edge of said other door section and having its pivot axis displaced outwardly from the plane of the door section and in axial alignment with the hinge axis of said first pivot means; and
   means for slideably securing said door sections in said opposed slideable relation comprising first means on said door sections for engaging said door sections in said slideable relation; and second means on said doors spaced from said first slideably engaging means for engaging said door sections in said slideable relations;
   whereby the first and second housing portions can be telescoped to the extent that one door section substantially completely overlies the other door section.

2. The vehicle of claim 1 having doorways defined by said door sections, said second door section being sufficiently narrower than the doorway defined by said first door section to allow said second door section to swing therethrough.

3. The vehicle of claim 1 wherein said first and second housing portions are upper and lower housing portions, respectively.

4. The vehicle of claim 1 including lock releasing means on said first door section accessible when said trailer is substantially contracted.

5. The vehicle of claim 1 including first lock releasing means accessible when said trailer is in said extended form and normally inaccessible when said trailer is in said contracted form, and an auxiliary lock releasing means accessible when said trailer is in said contracted form.

6. A vehicle that can be telescoped from an extended to a contracted form comprising:
   a first housing portion having a first door section thereon,
   a second housing portion slidably within said first housing portion and having a second door section thereon.

in opposed slidable relation to said first door section,
pivot means for said first door section,
pivot means for said second door section aligned with said pivot means for said first door section, and
a lock and releasing means including a handle member, for releasing said lock, on one or the other of said door sections accessible from inside said vehicle when said vehicle is in said extended form and normally inaccessible when said vehicle is in said contracted form, said lock releasing means also including an auxiliary member, for releasing said lock, accessible from inside said vehicle when said vehicle is in said contracted form.

References Cited

UNITED STATES PATENTS 3,021,170  2/1962  Cornelius _____ 296—23.3
3,103,995  9/1963  Dugger _____ 49—392 X KENNETH DOWNEY, Primary Examiner U.S. Cl. X.R.
22—67; 49—394; 296—23